United States Patent
Goi et al.

[11] Patent Number: 6,042,499
[45] Date of Patent: Mar. 28, 2000

[54] POWER TRANSMISSION DEVICE FOR HELICOPTER

[75] Inventors: Tatsuhiko Goi; Nobuyuki Yamauchi, both of Kakamigahara, Japan

[73] Assignee: Advanced Technology Institute of Commuter-Helicopter, Ltd., Gifu, Japan

[21] Appl. No.: 08/702,456

[22] PCT Filed: Jan. 25, 1996

[86] PCT No.: PCT/JP96/00141

§ 371 Date: Dec. 9, 1996

§ 102(e) Date: Dec. 9, 1996

[87] PCT Pub. No.: WO96/22914

PCT Pub. Date: Jan. 8, 1996

[30] Foreign Application Priority Data

Jan. 27, 1995 [JP] Japan .................................. 7-011895

[51] Int. Cl.⁷ .................................................. B64C 27/54
[52] U.S. Cl. ........................................ 475/215; 475/214
[58] Field of Search .................................... 475/214, 330, 475/215, 216, 217

[56] References Cited

U.S. PATENT DOCUMENTS

| 3,574,289 | 4/1971 | Scheiter | 477/31 |
|---|---|---|---|
| 3,748,927 | 7/1973 | Hertzog et al. | 475/8 |
| 3,977,632 | 8/1976 | Watson | 244/60 |
| 4,382,188 | 5/1983 | Cronin | 290/1 C |
| 4,768,398 | 9/1988 | Greenwoood | 475/216 |
| 4,856,371 | 8/1989 | Kemper | 475/215 |
| 4,856,374 | 8/1989 | Kreuzer | 475/189 |
| 4,922,788 | 5/1990 | Greenwood | 475/216 X |
| 5,090,951 | 2/1992 | Greenwood | 475/216 |
| 5,232,414 | 8/1993 | Fellows et al. | 475/216 |
| 5,271,295 | 12/1993 | Marnot | 74/665 B |
| 5,782,433 | 7/1998 | Goi et al. | 475/216 X |

FOREIGN PATENT DOCUMENTS

| 84724 | 3/1983 | European Pat. Off. . | |
|---|---|---|---|
| 441935 | 2/1992 | Japan . | |
| 4287799 | 10/1992 | Japan . | |
| 4296241 | 10/1992 | Japan . | |
| 4306196 | 10/1992 | Japan | B64C 27/59 |
| 5139386 | 6/1993 | Japan | B64C 27/04 |
| 5149351 | 6/1993 | Japan | F16D 41/06 |

*Primary Examiner*—Charles A Marmor
*Assistant Examiner*—Ha Ho
*Attorney, Agent, or Firm*—Baker Botts L.L.P.

[57] ABSTRACT

The engines which have output shafts connected to traction speed change mechanisms via freewheel clutches are decelerated or accelerated at a desired speed change ratio and then rotate and drive a collector gear and a main rotor shaft. A part of output torque of the engines is diverted into gears to drive and rotate accessories and a tail rotor. Such an arrangement is useful for a power transmission for a helicopter in that it enables the speed of rotation of the main rotor to be varied while the speed of rotation of the engines is kept constant.

3 Claims, 10 Drawing Sheets

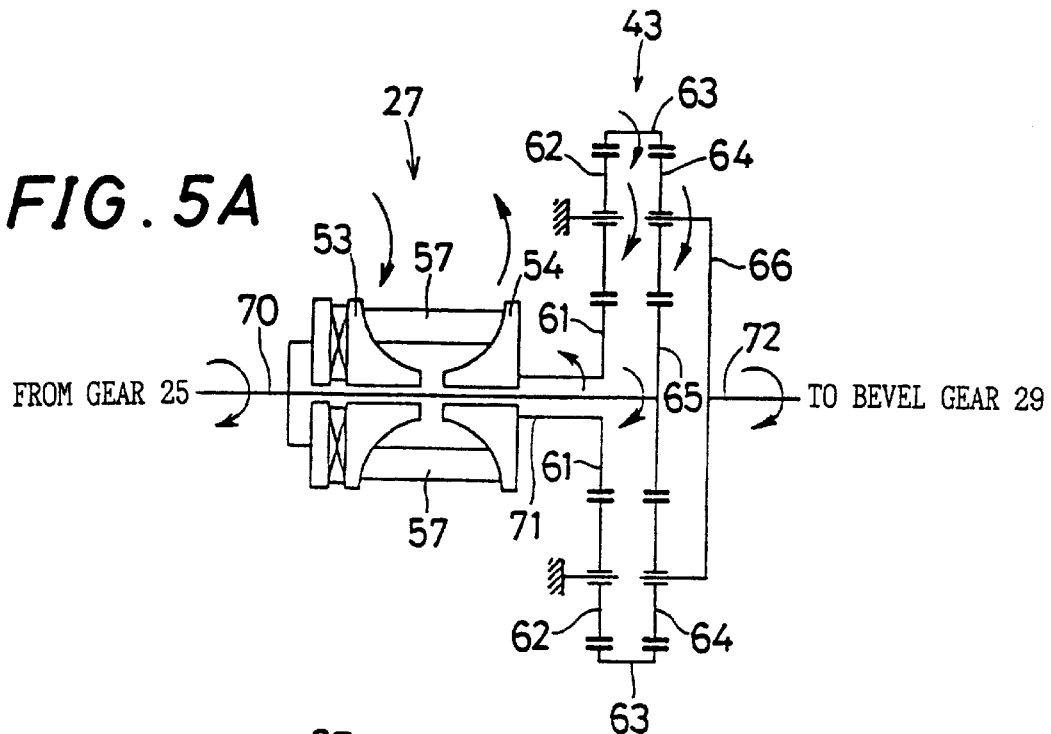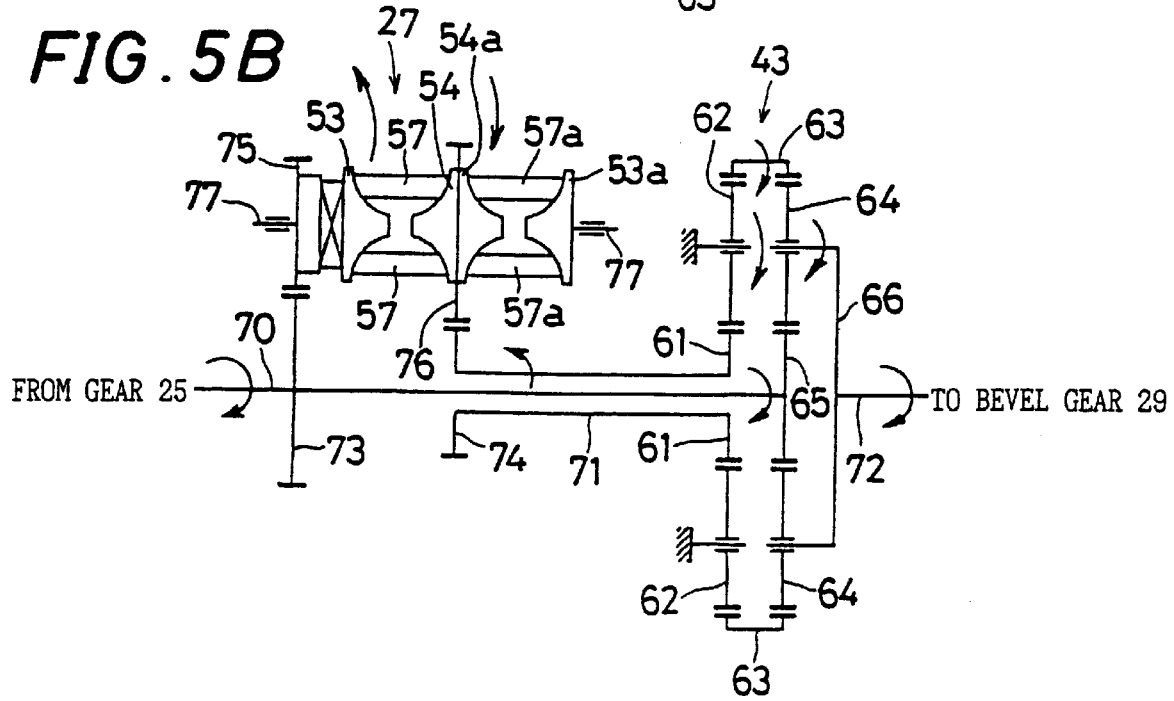

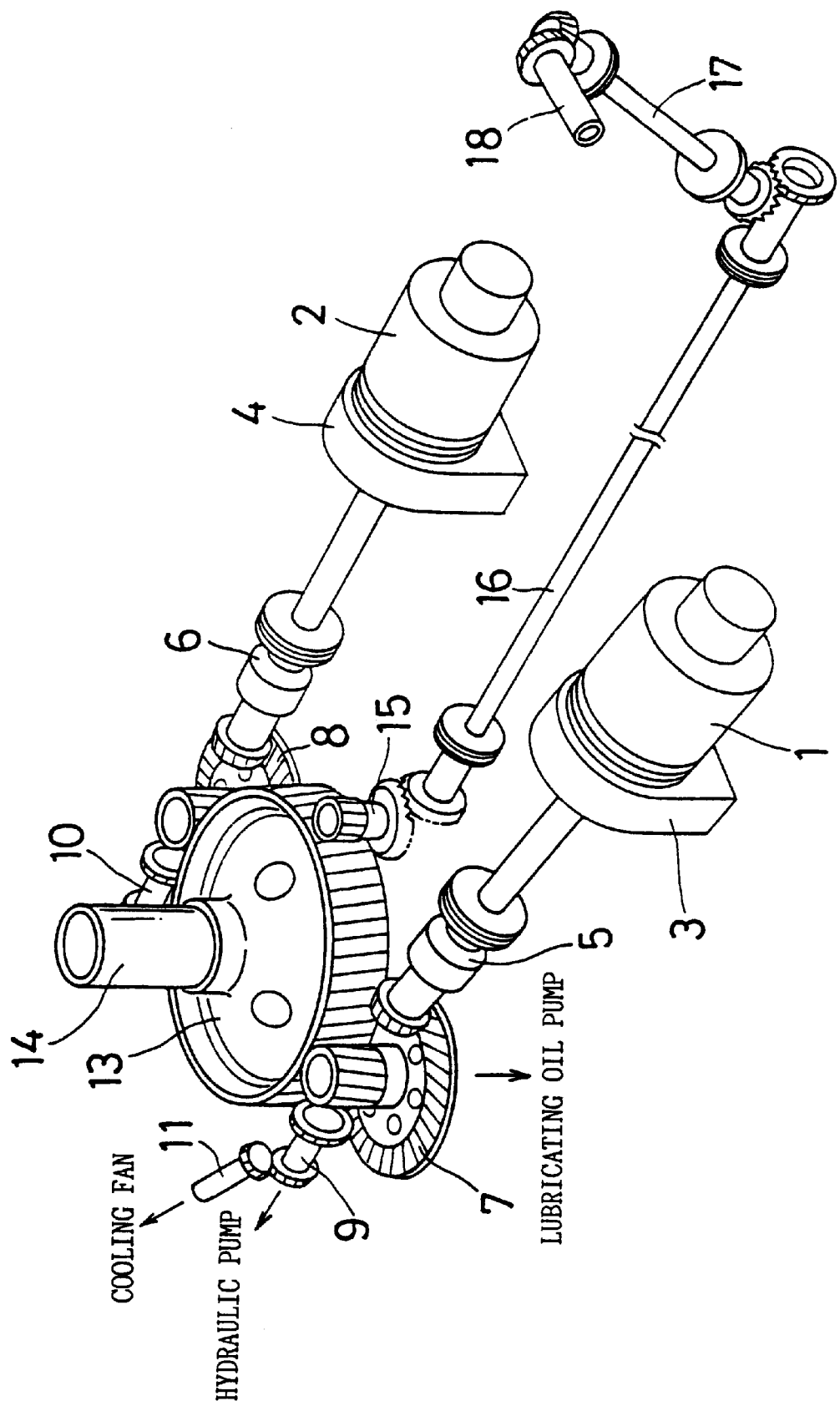

POWER TRANSMISSION DEVICE FOR HELICOPTER

FIELD OF THE INVENTION

This invention relates to a power transmission device for a helicopter which device is capable of continuously varying a rotating speed of a main rotor over a wide range.

BACKGROUND OF THE INVENTION

Recently the demand for a commuter helicopter which lands and takes off in an urban heliport is increasing, and noise reduction is required for realizing such a commuter helicopter. One of effective countermeasures is to slow down the rotating speed of the main rotor.

FIG. 10 is a perspective view showing an example of a conventional power transmission mechanism for a helicopter. The main rotor is fixed on an extension of a main rotor shaft 14, and a tail rotor is fixed on an extension of a tail rotor shaft 18. Output shafts of a pair of engines 1, 2 rotate at 20,000 to 30,000 rpm, whose rotation speed is reduced to about 6,000 rpm by gear boxes 3, 4. The output shafts are coupled to spiral bevel gears 7, 8 through freewheel clutches 5, 6 and are further in mesh with one collector gear 13, thereby rotating and driving the main rotor shaft 14 at about 350 rpm. Relating to peripheral accessories, a lubricant pump is driven by spiral bevel gears 7, 8, and a hydraulic pump is driven through transmission shafts 9, 10, and a cooling fan is driven through a transmission shaft 11.

On the other hand, a gear 15 is in mesh with the collector gear 13 and coupled with three tail rotor shafts 16, 17 and 18 so as to divide the torque of the collector gear 13, thereby rotating and driving the tail rotor at about 2,200 rpm.

As other prior arts, Japanese Unexamined Patent Publications JP-A 4-287799(1992), JP-A 4-306196(1992), JP-A 5-139386(1993), and JP-A 5-149351(1993) are known.

In conventional helicopters, since revolution of the engines 1, 2 is slowed down at a fixed reduction ratio by different gear trains, the main rotor and tail rotor can rotate only at a constant number of rotations.

Accordingly, in order to decrease the rotating speed of the main rotor to reduce noises, it is necessary to decrease a number of revolutions per unit time of the engine. However, since a conventional engine is designed so as to attain its maximum performance at a predetermined number of revolutions of the engine, it is difficult to control the number of revolutions of the engine unrestrictedly, and the number of revolutions can be lowered by at most only about 3%. Additionally, it may be considered to control the number of revolutions of the engine by optimizing the fuel flow rate and ignition timing by electronic control of the engine, but because of other problems such as lowered efficiency, generation of resonance and limitation of allowable strength of transmission system, at the present the number of revolutions of the engine can be varied by only a small percent in practice. Besides, if the number of rotations of the main rotor is decreased to a large extent, the lift may drop, and the flight performance of the helicopter may be lowered.

It is hence a more practical manner to decrease the number of rotations of the main rotor over urban districts to reduce noises, and return the number of rotations of the main rotor to an optimum over rural districts so as to fly at its maximum performance. For example, it is reported that the equivalent weight noise level is lowered by 3 dB to 5 dB by decreasing the number of rotations of the main rotor or the wing end speed by 10%.

DISCLOSURE OF THE INVENTION

It is an object of the invention to provide a power transmission device for a helicopter, capable of continuously changing a rotating speed of a main rotor over a wide range (a variable range of 0% to 30%, if necessary, more than 30% is optionally designable), while a number of revolutions of an engine is kept constant.

The invention provides a power transmission device for a helicopter, the device comprising:

a traction speed change mechanism having a continuously variable speed change ratio, connected to an output shaft of an engine, a collector gear connected to an output shaft of the traction speed change mechanism, and a main rotor shaft which is directly connected to the collector gear to drive and rotate a main rotor.

According to the invention, a number of rotations of the main rotor can be continuously decreased or increased, while a number of revolutions of an engine is kept constant, by providing the traction speed change mechanism which has a continuously variable speed change ratio, between the output shaft of the engine and the collector gear. Therefore, noises can be reduced, with the best performance of the engine maintained, by decreasing the number of rotations of the main rotor, while the motional performance (e.g., swivel, acceleration, ascending rate, and altitude performance) of the helicopter can be improved by increasing the number of rotations of the main rotor.

The traction transmission mechanism comprises, for example, a half toroidal CVT (continuously variable transmission), a full toroidal CVT, or the like, thereby realizing a small-sized, light-weight reduction mechanism which sustains little loss. Connecting such a transmission to a transmission shaft which rotates at high speed like an output shaft of engine permits the allowable maximum torque to be lowered, and thus contributes to the reduction in size and weight of the transmission.

The invention provides a power transmission device for a helicopter, the device comprising:

a traction speed change mechanism having a continuously variable speed change ratio, connected to an output shaft of an engine, a ring gear driven by an output shaft of the traction speed change mechanism, a sun gear connected to the output shaft of the engine, a planetary gear in mesh with the ring gear and the sun gear, a carrier which picks up orbital motion of the planetary gear to drive a collector gear, and a main rotor shaft directly connected to the collector gear to drive and rotate a main rotor.

According to the invention, a number of rotations of the main rotor can be continuously decreased or increased, while a number of revolutions of the engine is kept constant, by providing a traction speed change mechanism having a continuously variable speed change ratio and a planetary gear transmission between the output shaft of the engine and the collector gear. Thus, in the same way as mentioned above, the noises can be reduced and the motional performance of the helicopter can be improved.

The invention provides a power transmission device for a helicopter, the device comprising:

a traction speed change mechanism having a continuously variable speed change ratio, connected to an output shaft of an engine, a first sun gear connected to an output shaft of the traction speed change mechanism, a first planetary gear in mesh with the circumference of the first sun gear and journaled by a housing, a second sun gear connected to the output shaft of the engine, a second planetary gear in mesh with the circumference of the second sun gear, a ring gear whose inside teeth are in mesh with the first planetary gear and the second planetary gear, a carrier which picks up orbital motion of the second planetary gear to drive a collector gear, and a main rotor shaft which is directly connected to the collector gear to drive and rotate a main rotor.

According to the invention, there are provided a first planetary gear system having a first sun gear, a first planetary gear and a ring gear, and a second planetary gear system having a second sun gear, a second planetary gear and the ring gear, both systems having the ring gear in common. The output of the traction speed change mechanism is transmitted to the ring gear through the first sun gear and the first planetary gear, while the output of the engine is transmitted to the carrier through the second sun gear and the second planetary gear. Then, a number of rotations of the carrier can be increased or decreased by increasing or decreasing a number of rotations of the ring gear with the traction speed change mechanism. Thus, most of the output torque of the engine is transmitted by the second planetary gear system, while the torque required for the control of the speed change is transmitted by the traction speed change mechanism and the first planetary gear system. This relieves the traction speed change mechanism of burdens and improves the lifetime, reliability and efficiency.

In the invention, the tail rotor is preferably driven by diverting the drive torque from the output shaft of the engine.

In the invention, the accessories are preferably driven by diverting the drive torque from the output shaft of the engine.

That is, because the tail rotor and the accessories such as lubricant pumps, hydraulic pumps, and cooling fans are driven by diverting the drive torque from the output shaft of the engine, the tail rotor and the accessories are stably operated as long as the engine revolves at a constant number of revolutions even in the case that the number of rotations of the main rotor is varied by the speed control. Additionally, in the case that one engine has failed, the flight can be continued because the tail rotor and the accessories can be driven by another engine.

BRIEF DESCRIPTION OF THE DRAWINGS

FIGS. 3(a) and 3(b) are elevational views illustrating the traction speed change mechanism in deceleration and acceleration operations, respectively, FIG. 3(c) is a perspective view of the traction speed change mechanism;

FIGS. 5(a) and 5(b) are constructional views illustrating examples of the traction speed change mechanism 27 and a planetary gear transmission 43, namely, FIG. 5(a) shows an example employing a half toroidal CVT of single-cavity type, and FIG. 5(b) an example employing a half toroidal CVT of double-cavity type;

FIG. 10 is a diagrammatic view illustrating an example of conventional power transmission system for helicopters.

BEST MODE FOR EMBODYING THE INVENTION

Figure 1:
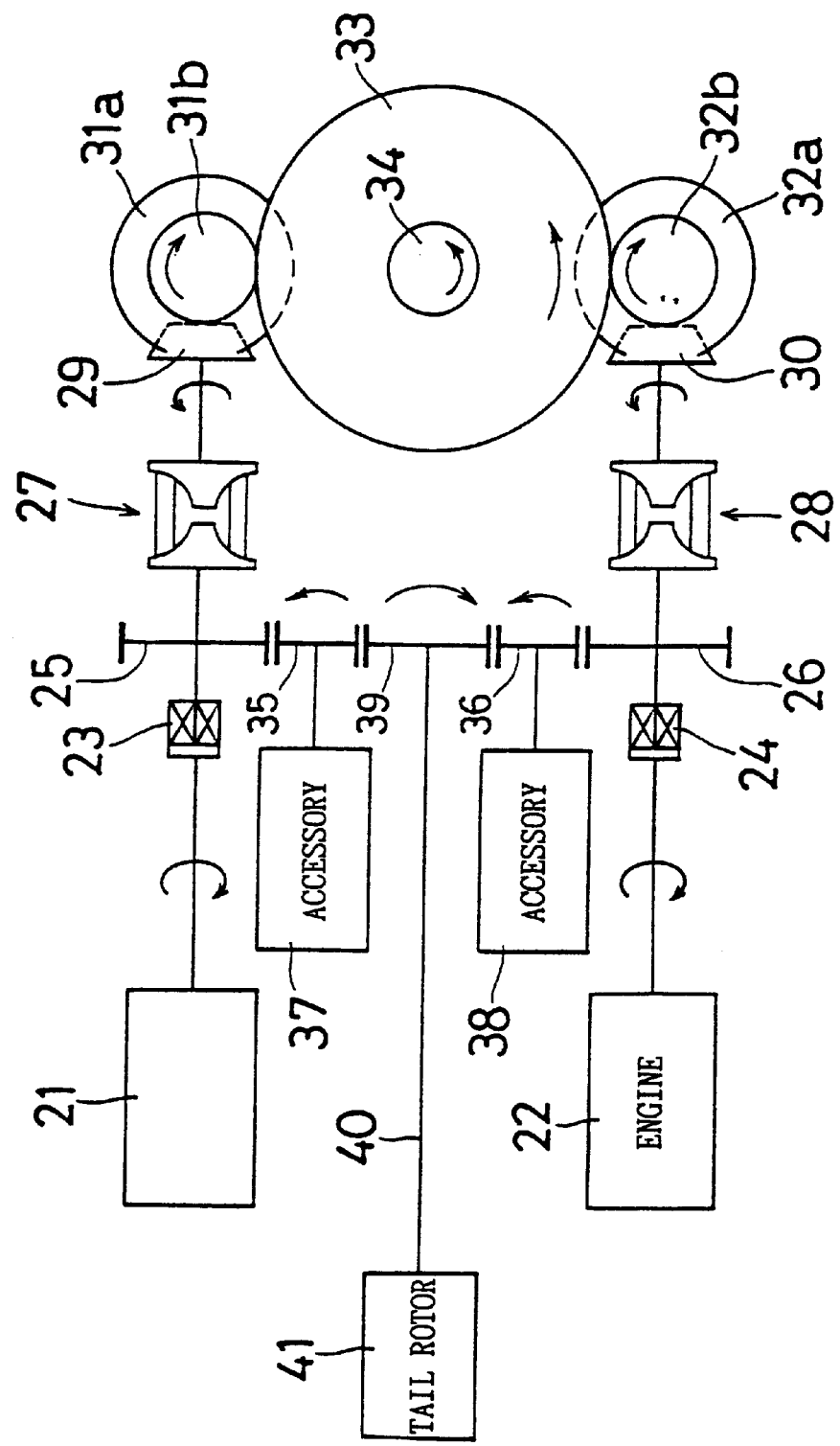
FIG. 1 is a constructional view illustrating an embodiment of the invention.

FIG. 1 is a constructional view illustrating an embodiment of the invention. Output shafts of a pair of engines 21, 22 are connected to gears 25, 26, respectively, via freewheel clutches 23, 24 capable of transmitting torque in a single direction. The gear 25, 26 are connected to input shafts of traction speed change mechanisms 27, 28 of such a type as half or full toroidal CVT type, respectively, and speed decrease or increase of the engines is carried out at a desired speed change ratio. Output shafts of the traction speed change mechanisms 27, 28 are connected to bevel gears 29, 30, respectively, which are in mesh with bevel gears 31a, 32a so that the directions of the rotational axes are changed. A gear 31b integrated in rotation with the bevel gear 31a and a gear 32b integrated in rotation with the bevel gear 32a are in mesh with a collector gear 33 to drive and rotate a main rotor shaft 34. Thus the number of rotations of the main rotor coupled to the main rotor shaft 34 can be adjusted by adjusting the speed change ratios of the traction speed change mechanisms 27, 28 in a state where the number of revolutions of the engines is kept constant.

On the other hand, outputs of the engines 21, 22 are diverted into gears 35, 36 which are in mesh with the gears 25, 26, respectively. The gears 35, 36 are in mesh with a gear 39 to drive and rotate a tall rotor 41 via a tail rotor shaft 40 while driving accessories 37, 38 such as lubricant pumps, hydraulic pumps, and cooling fans. Thus, since the tail rotor 41 and the accessories 37, 38 are driven with the engine torque which has not entered the traction speed change mechanisms 27, 28, the influence of the control of the rotating speed of the main rotor can be avoided with the result that the operation is stabilized. Additionally, even in the case of failure of one engine, the flight can be continued because the tail rotor and the accessories can be driven by another engine.

In FIG. 1, there is illustrated an arrangement in which the traction speed change mechanisms 27, 28 are connected through the freewheel clutches 23, 24, however, the speed change mechanisms can be directly connected to the engines 21, 22 to form engine gearboxes.

Figure 2:
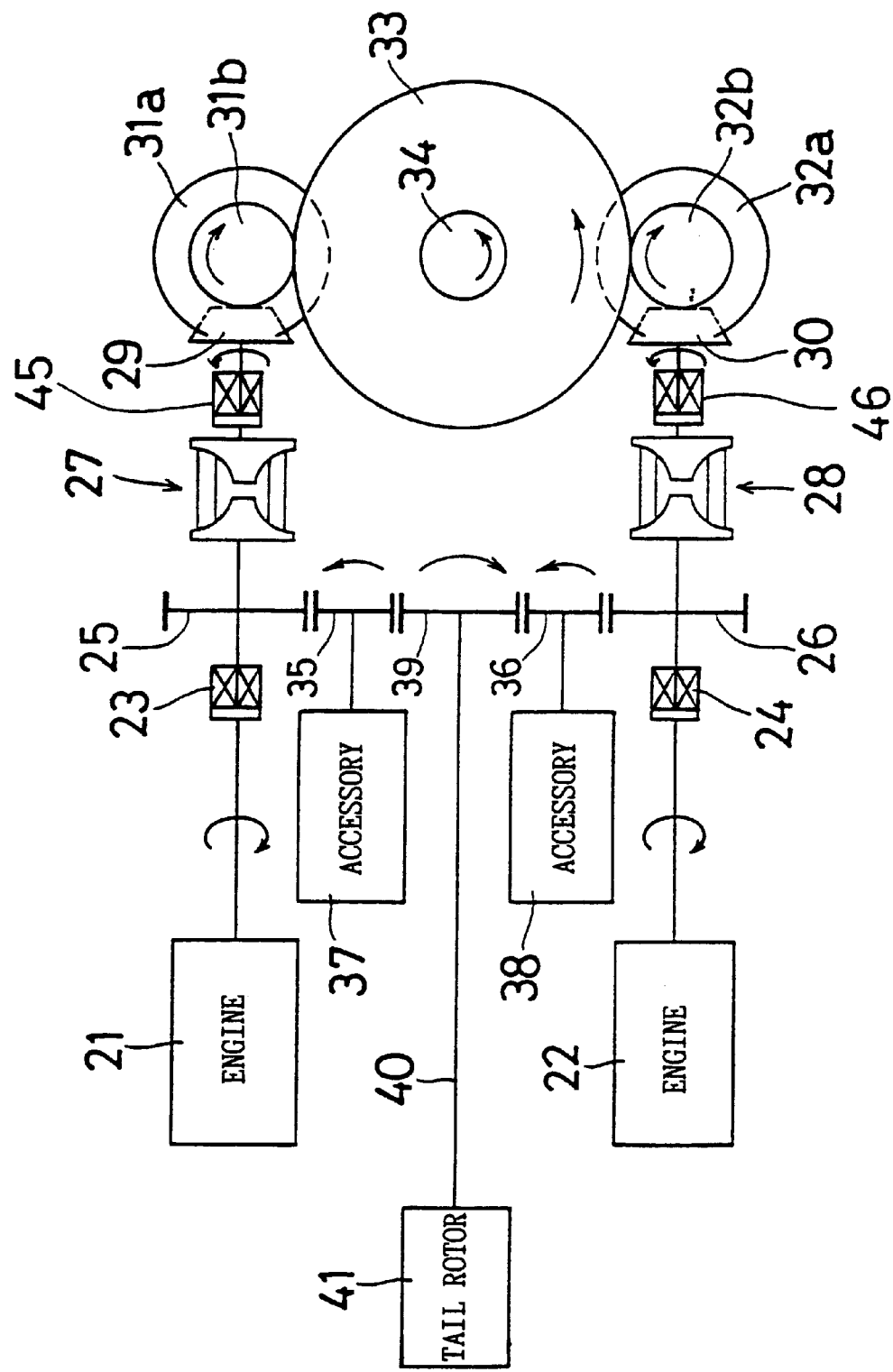
FIG. 2 is a constructional view illustrating another embodiment of the invention.

FIG. 2 is a constructional view illustrating another embodiment of the invention. The overall arrangement in FIG. 2 is the same as that in FIG. 1 except that freewheel clutches 45, 46 exist between traction speed change mechanisms 27, 28 and bevel gears 29, 30, respectively.

The freewheel clutches 45, 46 transmit torque only unilaterally, and therefore, in the case that by any chance one of the traction speed change mechanisms 27, 28 has got stuck and has failed due to seizure or other causes, disengagement of the freewheel clutch on the stuck side allows the flight with one engine and the remaining transmission system.

Figures 3A, 3B:
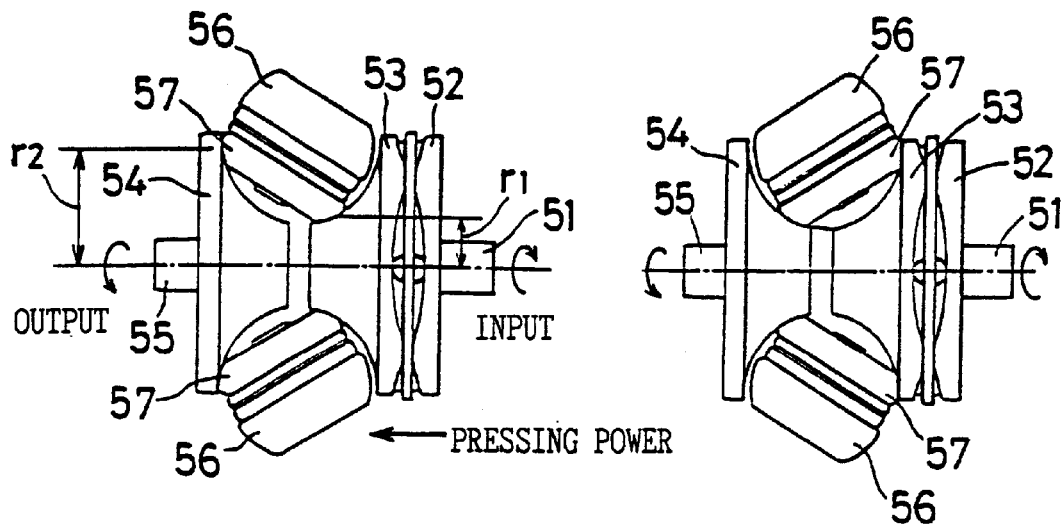
FIGS. 3(a) to 3(c) are views illustrating an example of traction speed change mechanisms 27, 28.
Figure 3C:
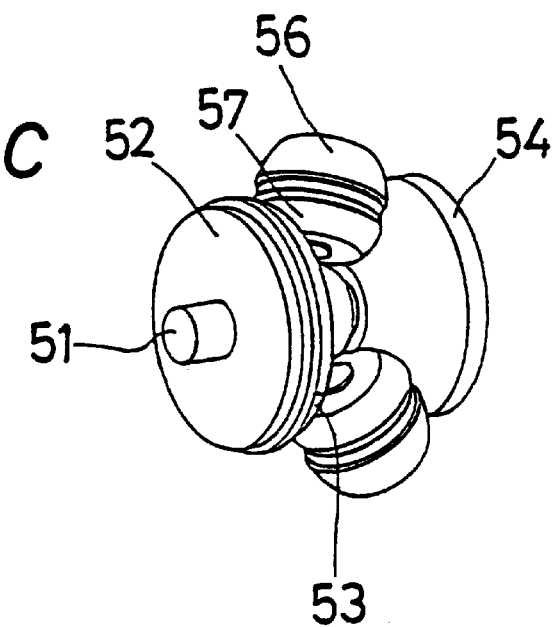

FIGS. 3(a) to 3(c) illustrate an example of the traction speed change mechanisms 27, 28; FIGS. 3(a), 3(b) are elevational views illustrating the example which is in operation for decreasing and for increasing the traction speed, respectively, and FIG. 3(c) is a perspective view of the example. Although an example of a half toroidal CVT is illustrated in FIGS. 3, a full toroidal CVT or others may be applied to the invention.

In the half toroidal CVT, an input shaft 51 is fixed to a pressurizer 52 to drive and rotate an input disc 53 which is pressed by the pressurizer 52. On the inner sides of the input disc 53 and an output disc 54, there are formed contact surfaces, which are like toroid surfaces and are opposed to each other. A traction drive is realized by contacts between transmission rollers 57 and each contact surface of the input disc 53 and output disc 54. The transmission rollers 57 are journaled by trunnions 56 so as to be able to rotate having a tilt along the contact surfaces. The trunnions 56 can be displaced along the tilted rotational axes of the transmission rollers 57 (i.e., in the direction perpendicular to the sheet including FIG. 3), and the tilt angles of the transmission rollers 57 can be controlled by adjusting the displacement.

Providing that the radius of the contact area of the transmission rollers 57 and the input disc 53 is represented as r1, and that the radius of the contact area of the transmission rollers 57 and the output disc 54 is represented as r2, the speed change ratio is given by r1/r2. In FIG. 3(a), r1 is smaller than r2, and therefore a number of rotations of the output disc 54 is smaller than that of the input disc 53 with the result that the speed is reduced. In FIG. 3(b), r1 is larger than r2, and therefore a number of rotations of the output disc 54 is larger than that of the input disc 53 with the result that the speed is increased. The output disc 54 which is thus given a number of rotations reduced or increased at a desired speed change ratio is connected to the outside through an output shaft 55.

Thus, with the traction speed change mechanisms, the speed change ratio can be continuously adjusted, and the traction speed change mechanisms are suitable for helicopters which are severely restricted in weight, because the traction speed change mechanisms have high transmission efficiency with the small-sized, light-weight structures.

Figure 4:
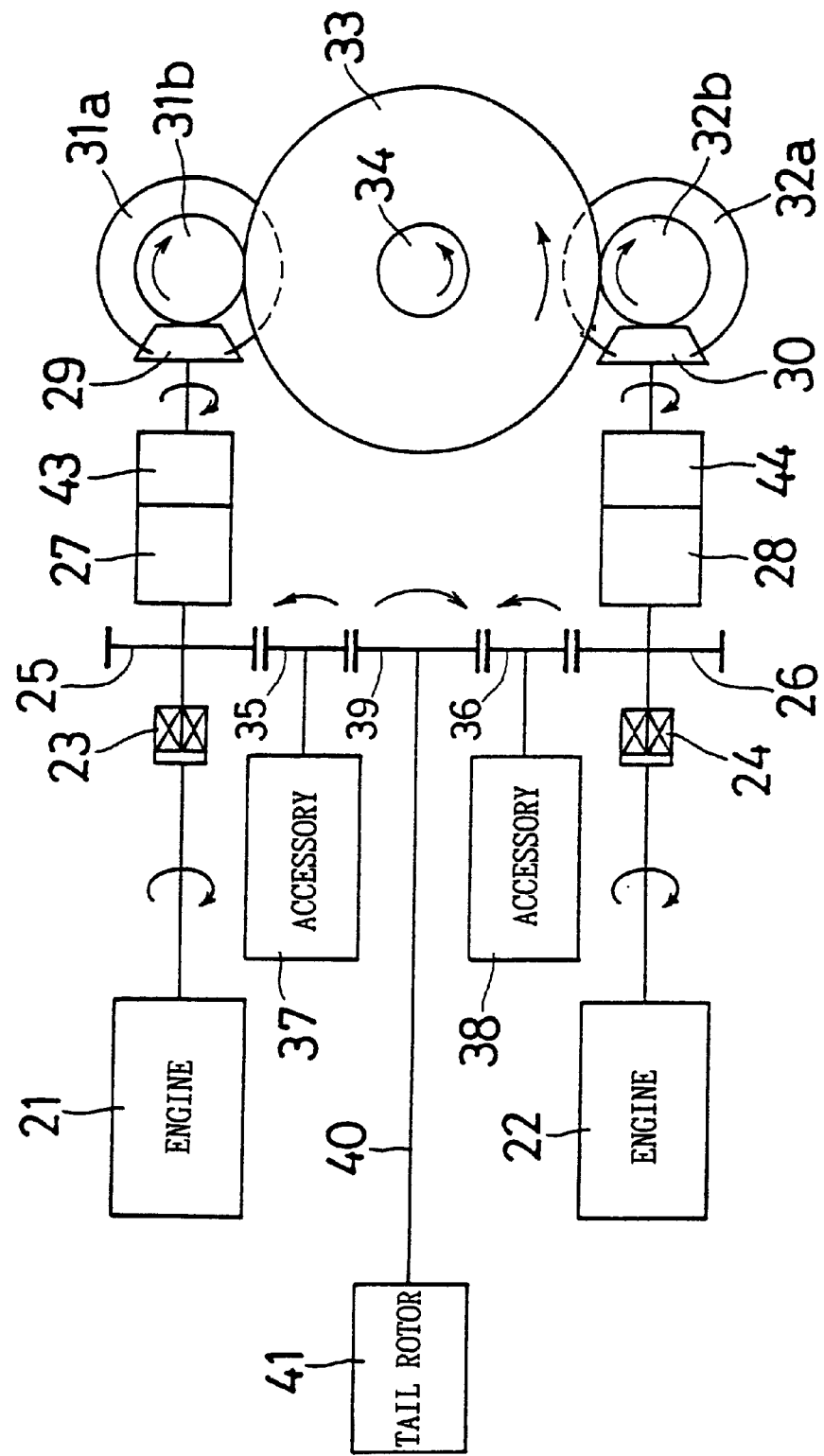
FIG. 4 is a constructional view illustrating another embodiment of the invention.

FIG. 4 is a constructional view illustrating another embodiment of the invention. Output shafts of a pair of engines 21, 22 are connected to gears 25, 26, respectively, via freewheel clutches 23, 24 which are capable of transmitting torque in a single direction. The gears 25, 26 are connected to the traction transmissions 27, 28 as described above and planetary gear transmissions 43, 44, respectively, to decrease or increase the number of rotations at a desired speed change ratio. Output shafts of the planetary gear transmissions 43, 44 are connected to the bevel gears 29, 30, respectively, which are in mesh with the bevel gears 31a, 32a so that the directions of the rotational axes are changed. The gear 31b integrated in rotation with the bevel gear 31a and a gear 32b integrated in rotation with the bevel gear 32a are in mesh with a collector gear 33 to drive and rotate a main rotor shaft 34. Thus the number of rotations of the main rotor coupled to the main rotor shaft 34 can be adjusted by adjusting the speed change ratios of the traction speed change mechanisms 27, 28 in a state where the number of revolutions of the engines 21, 22 is kept constant.

On the other hand, outputs of the engines 21, 22 are diverted into the gears 35, 36 which are in mesh with the gears 25, 26, respectively. The gears 35, 36 are in mesh with a gear 39 to drive and rotate the tail rotor 41 via the tail rotor shaft 40 while driving the accessories 37, 38 such as lubricant pumps, hydraulic pumps, and cooling fans. Thus driving the tail rotor 41 and the accessories 37, 38 with the engine torque which has not entered the traction speed change mechanisms 27, 28 can avoid the influence of the control of the speed of the main rotor to stabilize the operation.

In FIG. 4, there is illustrated an arrangement in which both the traction speed change mechanisms 27, 28 and the planetary gear transmissions 43, 44 are connected to the engines 21, 22 through the freewheel clutches 23, 24, respectively, however, the speed change mechanisms can be directly connected to the engines 21, 22, respectively, to form engine gearboxes. In FIG. 4, it is possible to place freewheel clutches between the planetary gear transmissions 43, 44 and the bevel gears 29, 30 in the same way as shown in FIG. 2. With such an arrangement, in the case that by any chance one of the traction speed change mechanisms 27, 28 has got stuck and has failed due to seizure or other causes, disengagement of the freewheel clutch on the stuck side allows the flight with one engine and the remaining transmission system.

Figure 6A:
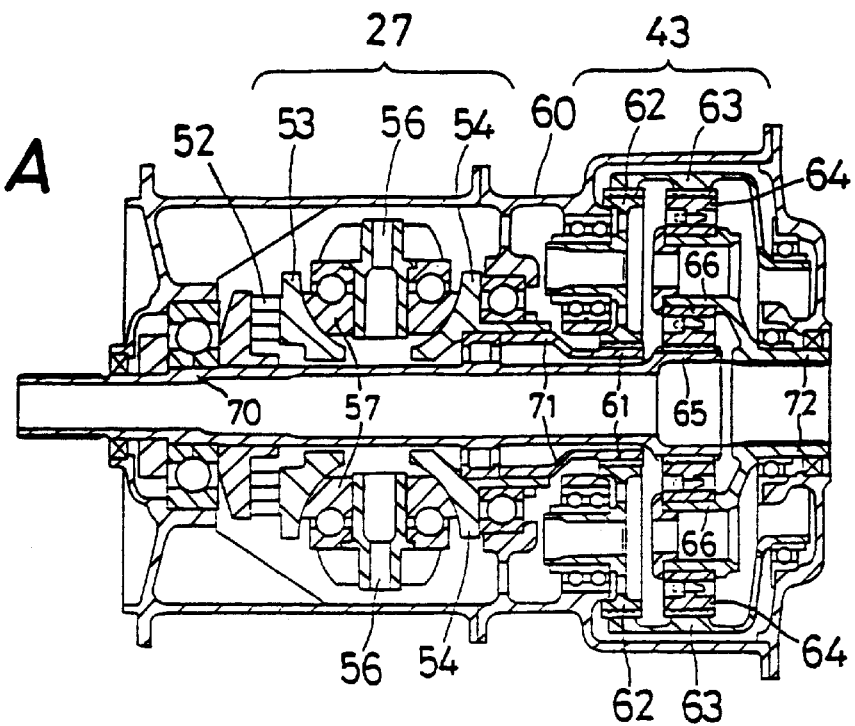
FIG. 6(a) is a sectional view of FIG. 5(a)
Figure 6B:
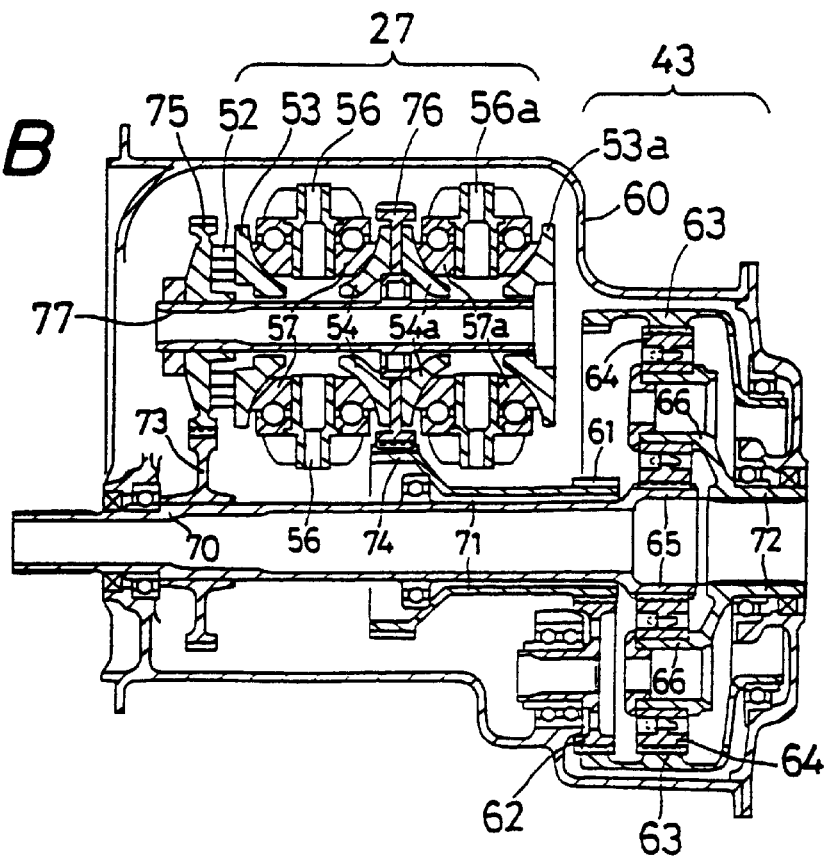
FIG. 6(b) is a sectional view of FIG. 5(b)

FIGS. 5(a) and 5(b) are constructional views illustrating examples of a traction speed change mechanism 27 and a planetary gear transmission 43, and FIGS. 6(a) and 6(b) are sectional views of the same. Specifically, FIGS. 5(a) and 6(a) illustrate an example which employs a half toroidal CVT of single-cavity type, and FIGS. 5(b) and 6(b) illustrate an example which employs a half toroidal CVT of double-cavity type. Since a traction speed change mechanism 28 and a planetary gear transmission 44 have the same structures, repetitive explanations for them are omitted.

First, the CVT of single-cavity type is explained. In FIGS. 5(a) and 6(a), a shaft 70 connected directly to the gear 25 penetrates through a cavity in the traction speed change mechanism 27. The shaft 70 is connected to a second sun gear 65 to transmit most of the engine torque to the gear 65, while a part of the torque of the shaft 70 is transmitted to the input disc 53 through the pressurizer 52. The torque of the input disc 53 is transmitted to the output disc 54 with a desired speed change ratio through transmission rollers 57 which are journaled by trunnions 56. The torque of the output disc 54 is transmitted to a first sun gear 61 coupled to a hollow shaft 71.

In the planetary gear transmission 43, the torque of the first sun gear 61 is transmitted to a first planetary gear 62 which is in mesh with the circumference of the first sun gear 61. The first planetary gear 62 is journaled by a housing 60 and are in mesh with internal teeth of a ring gear 63. Accordingly, the torque of the first sun gear 61, as a whole, is transmitted to the ring gear 63 and then transmitted to the second planetary gear 64 which is in mesh with the other internal teeth of the ring gear. The second planetary gear 64 is in mesh with the second sun gear 65, and a number of revolutions of the second planetary gear 64 round the sun gear is determined according to a number of rotations of the second sun gear 65 and a number of rotations of the ring gear 63. The orbital motion of the second planetary gear 64 is picked up by a carrier 66 and outputted through a shaft 72.

Thus driving the ring gear 63 with the traction transmission 27 in which the speed change ratio can be continuously varied enables the speed change ratio of the planetary gear transmission 43 to be controlled arbitrarily. Therefore, most of the engine torque can be transmitted by way of the planetary gear transmission 43, and the allowable transmitted torque of the traction speed change mechanism 27 can be thereby lowered.

Next, the CVT of double-cavity type is explained. In FIGS. 5(b) and 6(b), a shaft 70 connected directly to the gear 25 is connected to a second sun gear 65 to transmit most of the engine torque to the gear 65, while a part of the torque of the shaft 70 is diverted into an shaft 77 by gears 73, 75 and transmitted to input the discs 53, 53a. The torque of the input discs 53, 53a is transmitted to output discs 54, 54a with a desired speed change ratio through transmission rollers 57, 57a which are journaled by trunnions 56, 56a. Thus, the CVT of double-cavity type, in which two sets of transmission rollers 57, 57a are connected in parallel, has larger contact area of the transmission rollers than the CVT of single-cavity type, so that the CVT of double-cavity type is advantageous in durability and lifetime. Additionally, in the CVT of double-cavity type, the axial forces are completed inside the CVT, and thereby the efficiency is increased.

The torque of the output discs 54, 54a fixed to a gear 76 is transmitted to a gear 74 which is in mesh with a gear 76, and then transmitted to a first sun gear 61 coupled to a hollow shaft 71.

In the planetary gear transmission 43, the torque of the first sun gear 61 is transmitted to the first planetary gear 62 which is in mesh with the circumference of the first sun gear 61. The first planetary gear 62 is journaled by the housing 60 and is in mesh with internal teeth of the ring gear 63. Accordingly, the torque of the first sun gear 61, as a whole, is transmitted to the ring gear 63 and then transmitted to the second planetary gear 64 which is in mesh with the other internal teeth of the ring gear. The second planetary gear 64 is in mesh with the second sun gear 65, and the number of revolutions of the second planetary gear 64 round the sun gear is determined according to the number of rotations of the second sun gear 65 and the number of rotations of the ring gear 63. The orbital motion of the second planetary gear 64 is picked up by the carrier 66 and outputted through the shaft 72.

Thus driving the ring gear 63 with the traction transmission 27 in which the speed change ratio can be continuously varied enables the speed change ratio of the planetary gear transmission 43 to be controlled arbitrarily. Therefore, most of the engine torque can be transmitted by way of the planetary gear transmission 43, and the allowable transmitted torque of the traction transmission 27 can be thereby lowered.

Figure 7:
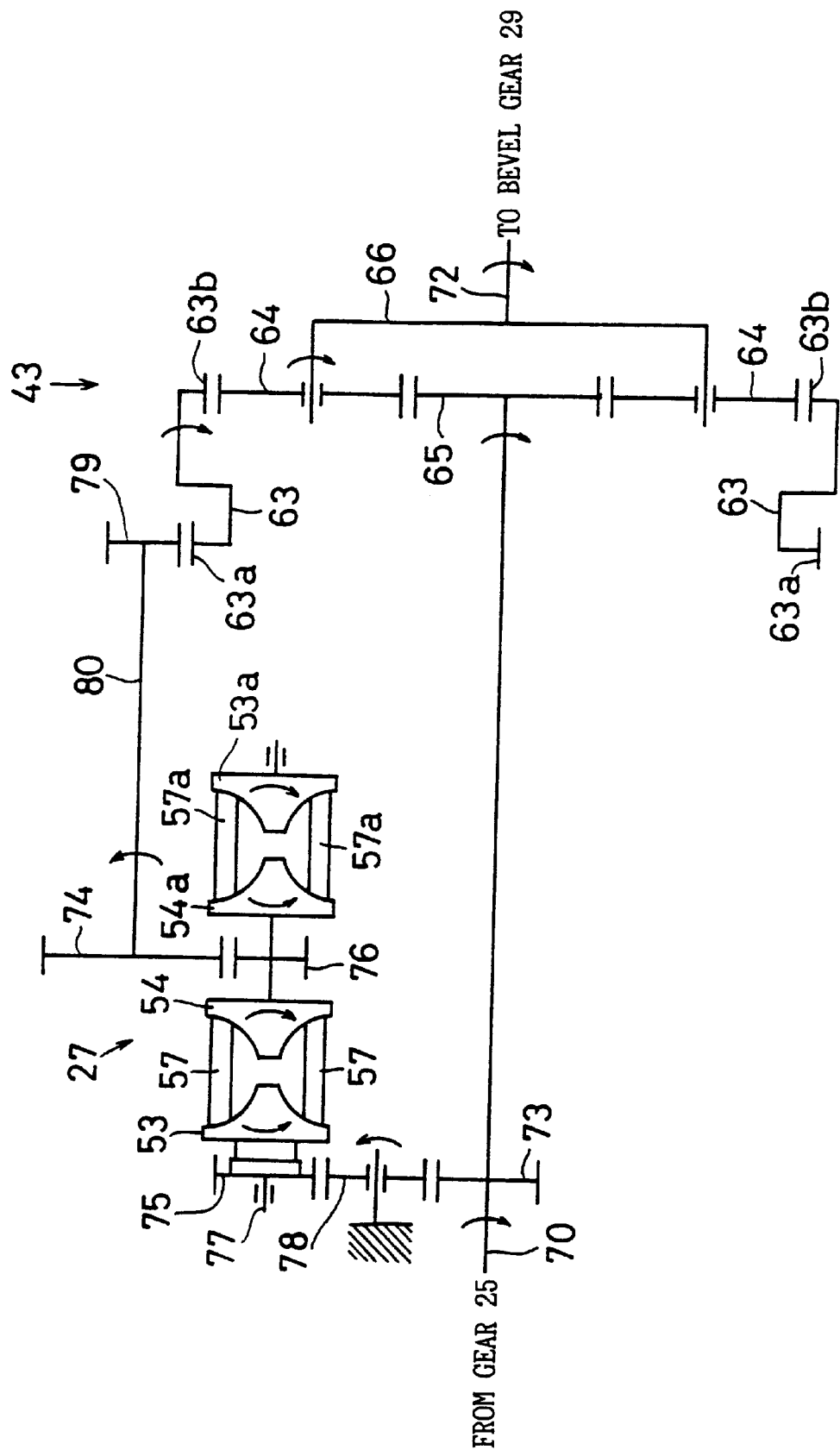
FIG. 7 is a constructional view illustrating another example of the traction speed change mechanism 27 and the planetary gear transmission 43.

FIG. 7 is a constructional view illustrating another example of the traction transmission 27 and the planetary gear transmission 43. There is illustrated an example in which the ring gear 63 of the planetary gear transmission 43 having a single stage is driven by the traction transmission 27 of double-cavity type.

In FIG. 7, a shaft 70 connected directly to the gear 25 is connected to the sun gear 65 to transmit most of the engine torque to the gear 65, while a part of the torque of the shaft 70 is diverted into an shaft 77 by gears 73, 78, 75 and transmitted to the input discs 53, 53a. The torque of the input discs 53, 53a is transmitted to output discs 54, 54a with a desired speed change ratio through the transmission rollers 57, 57a which are journaled by each trunnion (not shown). Thus, the CVT of double-cavity type, in which two sets of transmission rollers 57, 57a are connected in parallel, has a larger contact area of the transmission rollers as compared with the CVT of single-cavity type, so that the CVT of double-cavity type is advantageous in durability and lifetime. Additionally, in the CVT of double-cavity type, the axial forces are completed inside the CVT, and thereby the efficiency is increased.

The torque of the output discs 54, 54a fixed to a gear 76 is transmitted to a gear 74 which is in mesh with a gear 76, and then transmitted to a gear 79 through a shaft 80 placed apart from the shaft 70.

In the planetary gear transmission 43, outside teeth 63a and inside teeth 63b are formed on the ring gear 63 which rotates coaxially with the shaft 70, and the gear 79 is in mesh with the outside teeth 63a to drive the ring gear 63. Planetary gears 64 are in mesh with the inside teeth 63b of the ring gear 63, and the number of revolutions of the planetary gear 64 round the sun gear is determined according to the number of rotations of the sun gear 65 and the number of rotations of the ring gear 63. The orbital motion of the planetary gear 64 is picked up by the carrier 66 and outputted through the shaft 72.

Thus driving the ring gear 63 with the traction transmission 27 in which the speed change ratio can be continuously varied enables the speed change ratio of the planetary gear transmission 43 to be controlled arbitrarily. Therefore, most of the engine torque can be transmitted by way of the planetary gear transmission 43, and the allowable transmitted torque of the traction transmission 27 can be thereby lowered.

Figure 8:
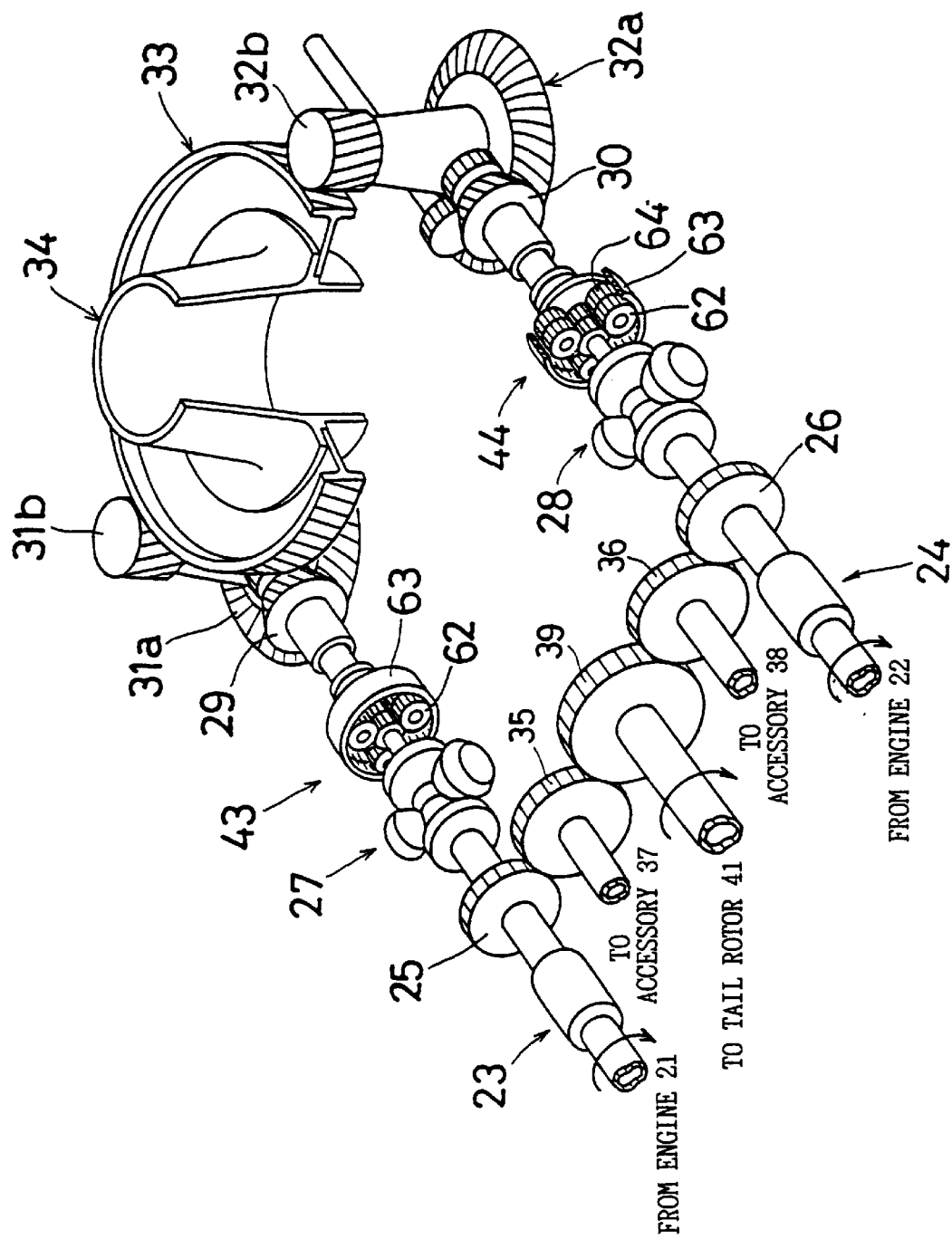
FIG. 8 is a sectional perspective view illustrating an example employing a half toroidal CVT of single-cavity type.

FIG. 8 is a sectional perspective view illustrating an example of a half toroidal CVT of single-cavity type. The output torque of the engines 21, 22 is inputted into the traction speed change mechanisms 27, 28 of single-cavity type and the planetary gear transmissions 43, 44. The overall speed change ratio is determined by adjusting the speed change ratio of the traction speed change mechanisms 27, 28, and the bevel gears 29, 30 are rotated at a number of rotations thereby reduced or increased. With this arrangement, the number of rotations of the main rotor coupled to a main rotor shaft 34 can be varied.

Figure 9:
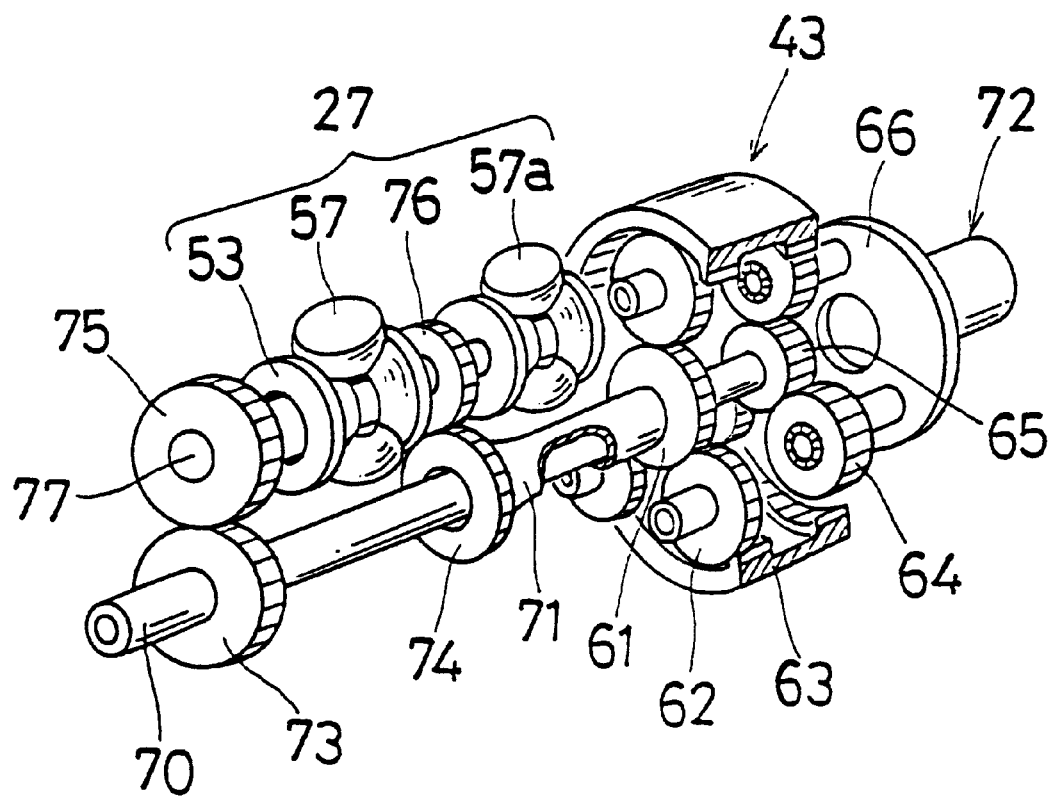
FIG. 9 is a sectional perspective view illustrating an example employing a half toroidal CVT of double-cavity type.

FIG. 9 is a sectional perspective view illustrating an example which employs a half toroidal CVT of double-cavity type. The output torque of engines is inputted into the traction speed change mechanism 27 of double-cavity type and the planetary gear transmission 43. The number of rotations of the ring gear 63 of the planetary gear transmission 43 is controlled by adjusting the speed change ratio of the traction speed change mechanism 27, and thereby the overall speed change ratio is determined.

Thus, since the speed change ratio of the planetary gear transmission is controlled with the traction speed change mechanism which has a variable speed change ratio, the traction speed change mechanism is relieved of burdens and a highly reliable power transmission system is realized.

EFFECT OF THE INVENTION

As described above in detail, in accordance with the invention, the number of rotations of the main rotor can be continuously varied. Therefore, the noises can be reduced in a state where the best performance of the engines is maintained, by decreasing the number of rotations of the main rotor, while the motional performance of the helicopter can be improved by increasing the number of rotations of the main rotor.

Additionally, driving the tail rotor and the accessories by diverting the drive torque from the output shafts of the engines avoids the influence of the control of the rotating speed of the main rotor to stabilize the operation of the helicopter.

What is claimed is:

1. A power transmission device for a helicopter, the device comprising:
    a traction speed change mechanism having a continuously variable speed change ratio, connected to an output shaft of an engine,
    a first sun gear connected to an output shaft of the traction speed change mechanism,
    a first planetary gear in mesh with the circumference of the first sun gear, and Journaled by a housing,
    a second sun gear connected to the output shaft of the engine,
    a second planetary gear in mesh with the circumference of the second sun gear,
    a ring gear of which inside teeth are in mesh with the first planetary gear and the second planetary gear,
    a carrier which picks up orbital motion of the second planetary gear to drive a collector gear, and
    a main rotor shaft which is directly connected to the collector gear to drive and rotate a main rotor.

2. The power transmission device for a helicopter of claim 1, wherein a tail rotor is driven by diverting drive torque from the output shaft of the engine.

3. The power transmission device for a helicopter of claim 1, wherein accessories are driven by diverting drive torque from the output shaft of the engine.

* * * * *

UNITED STATES PATENT AND TRADEMARK OFFICE
CERTIFICATE OF CORRECTION

PATENT NO. : 6,042,499

DATED : March 28, 2000

INVENTOR(S) : Goi et al.

It is certified that error appears in the above-identified patent and that said Letters Patent is hereby corrected as shown below:

Title, Page, Item [75] Inventors: "Nobuyuki Yamauchi," should read -- Nobuyoshi Yamauchi, --.

Signed and Sealed this

Third Day of April, 2001

*Attest:*

NICHOLAS P. GODICI

*Attesting Officer*  *Acting Director of the United States Patent and Trademark Office*